(12) United States Patent
Amicarelli

(10) Patent No.: US 10,357,018 B2
(45) Date of Patent: Jul. 23, 2019

(54) ELEVATED ANIMAL WASTE REPOSITORY

(71) Applicant: Ellen Beth Amicarelli, North Kingstown, RI (US)

(72) Inventor: Ellen Beth Amicarelli, North Kingstown, RI (US)

(*) Notice: Subject to any disclaimer, the term of this patent is extended or adjusted under 35 U.S.C. 154(b) by 434 days.

(21) Appl. No.: 15/349,111

(22) Filed: Nov. 11, 2016

(65) Prior Publication Data

US 2017/0318772 A1   Nov. 9, 2017

Related U.S. Application Data

(60) Provisional application No. 62/333,725, filed on May 9, 2016.

(51) Int. Cl.
*A01K 1/00* (2006.01)
*A01K 1/01* (2006.01)

(52) U.S. Cl.
CPC .................. *A01K 1/0107* (2013.01)

(58) Field of Classification Search
CPC .................. A01K 1/00; A01K 1/03
USPC .................. 119/161, 165–170
See application file for complete search history.

(56) References Cited

U.S. PATENT DOCUMENTS

| | | | | |
|---|---|---|---|---|
| 3,618,568 A | * | 11/1971 | Breeden | A01K 1/033 119/161 |
| 3,735,735 A | * | 5/1973 | Noroian | A01K 1/0107 119/165 |
| 4,497,279 A | * | 2/1985 | Bell | A01K 15/027 119/706 |
| 5,329,878 A | * | 7/1994 | McCauley | A01K 1/0107 119/165 |
| 5,329,879 A | * | 7/1994 | Walton | A01K 1/0107 119/165 |
| 5,394,825 A | * | 3/1995 | Schmid | C30B 15/00 117/13 |
| 5,713,302 A | * | 2/1998 | Walter | A01K 1/0107 119/165 |
| 5,775,258 A | * | 7/1998 | Larsen | A01K 1/0114 119/161 |
| 5,785,000 A | * | 7/1998 | Barbary | A01K 1/0114 119/166 |
| 5,924,383 A | * | 7/1999 | Smith | A01K 1/0157 119/165 |

(Continued)

OTHER PUBLICATIONS

Broad, M. (Dec. 4, 2013). Carpenter finds solution for ill cat and ill person. Retrieved Nov. 9, 2016, from http://pictures-of-cats.org/carpenter-finds-solution-for-ill-cat-and-ill-person.html.

(Continued)

*Primary Examiner* — Richard T Price, Jr.

(57) ABSTRACT

An elevated animal waste repository is provided. The repository includes a litter box, a base and a ramp. The litter box includes a bottom wall and a sidewall extending from the bottom wall. The sidewall may include an upper rim that forms an opening into the litter box. The base includes a bottom end and a top end. The litter box is secured to the top end of the base. The base supports the litter box in an elevated position when resting on a surface. The elevated position may be waist high level of an individual. The ramp runs from the bottom end of the base to the upper rim of the litter box, allowing a cat to access the inside of the litter box.

14 Claims, 3 Drawing Sheets

(56) References Cited

U.S. PATENT DOCUMENTS

| | | | | |
|---|---|---|---|---|
| 6,209,486 B1* | 4/2001 | Reynolds | A01K 1/0353 | 119/161 |
| 6,968,810 B2* | 11/2005 | Bishop | A01K 1/035 | 119/847 |
| 7,051,679 B2* | 5/2006 | Bello | A01K 1/033 | 119/482 |
| 7,207,292 B1* | 4/2007 | Colten | A01K 1/0114 | 119/161 |
| 7,228,818 B2* | 6/2007 | Lynch | A01K 1/0107 | 119/168 |
| 7,458,337 B2* | 12/2008 | Callan | A01K 1/0107 | 119/165 |
| 7,921,812 B1* | 4/2011 | Carrillo | A01K 13/001 | 119/602 |
| 8,020,518 B1* | 9/2011 | Reinke | A01K 15/025 | 119/482 |
| 8,230,810 B2* | 7/2012 | Mynatt | A01K 1/0114 | 119/166 |
| 8,413,610 B1* | 4/2013 | Fultz | A01K 13/001 | 119/665 |

OTHER PUBLICATIONS

LitterWorks LW412-LIT. (n.d.). Retrieved Nov. 9, 2016, from http://www.litterboxreviews.com/litterworks-lw412-lit/.

* cited by examiner

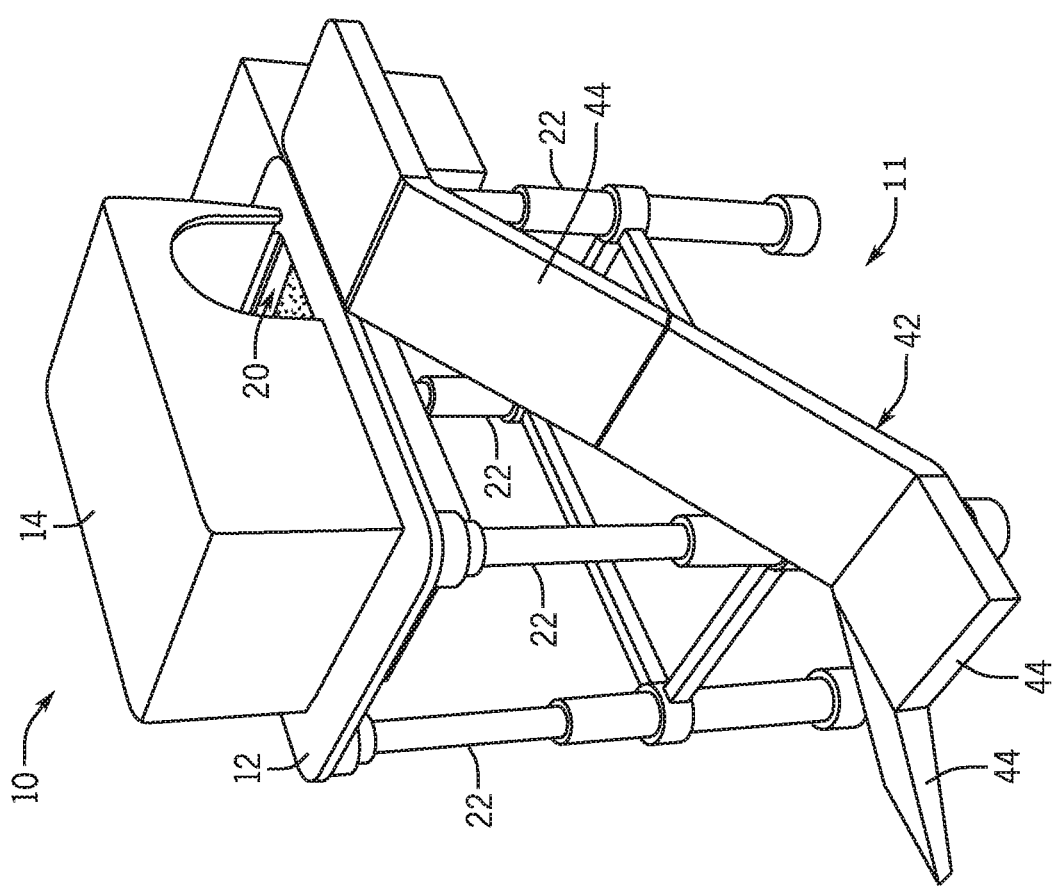

ELEVATED ANIMAL WASTE REPOSITORY

CROSS-REFERENCE TO RELATED APPLICATION

This application claims the benefit of priority of U.S. provisional application No. 62/333,725, filed May 9, 2016, the contents of which are herein incorporated by reference.

BACKGROUND OF THE INVENTION

The present invention relates to a litter box and, more particularly, to an elevated litter box.

A litter box is an indoor feces and urine collection box for animals, such as cats, that are permitted free roam of a home but who cannot or do not always go outside to relieve themselves. Many owners of these animals prefer not to let them roam outside for fear that they might succumb to outdoor dangers, such as weather, wildlife or traffic. A litter box makes it possible to shelter pets from these risks.

Currently, litter boxes are placed on the ground and the pet owner must bend down to the litter box to clean it and care for it. This is very problematic for pet owners that have back or knee problems or are disabled and limited in mobility. Further, the litter box creates obstacles for children playing on the ground and allows other animals to access the inside of the litter box, which may cause messes.

As can be seen, there is a need for a device that allows disabled individuals to clean a litter box without having to bend over.

SUMMARY OF THE INVENTION

In one aspect of the present invention, an elevated animal waste repository comprises: a litter box comprising a bottom wall and a sidewall extending from the bottom wall, wherein the sidewall comprises an upper rim forming an opening into the litter box; a base comprising a bottom end and a top end, wherein the litter box is attached to the top end of the base and the base supports the litter box in an elevated position when resting on a surface; and a ramp running from the bottom end of the base to the upper rim of the litter box.

In another aspect of the present invention, an elevated animal waste repository comprises: a litter box comprising a bottom wall and a sidewall extending from the bottom wall, wherein the sidewall comprises an upper rim forming an opening into the litter box; a plurality of legs comprising a bottom end and a top end, wherein the litter box is attached to the top end of the plurality of legs and the a plurality of legs supports the litter box in an elevated position when resting on a surface; and a ramp disposed adjacent to the plurality of legs, wherein the ramp runs from the bottom end of the base to the litter box.

These and other features, aspects and advantages of the present invention will become better understood with reference to the following drawings, description and claims.

BRIEF DESCRIPTION OF THE DRAWINGS

FIG. 3 is a perspective view of an alternate ramp of an embodiment of the present invention.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a cat litter box stand that adjusts to the approximate height of the waist of the pet owner. The cat litter box is raised by adjustable legs that bring the cat litter box to the height of the waist. There is a climbing ramp for the cat to climb up and into the litter box. The present invention elevates the cat litter box up off the ground to the level/height of the pet owner's waist and eliminates the need for the pet owner to bend down to the ground to clean and care for the litter box. Further, the present invention removes the litter box from the floor which prevents children from accessing the inside of the litter box.

The adjustable legs lock into place by a sliding mechanism or screw and pin mechanism. The recessed litter box frame is secured to the tops of each of the legs and the top surface cover of the litter box is secured to the top of the box. The climbing ramp unfolds and is secured to the top of the stand. Gripping material may be secured to the ramp by a hook and loop fastener or adhered to the ramp using glue or other adhesives. The present invention may further include a dirty litter receptacle secured to the top and side of the stand. A plastic bag may be secured inside the receptacle and the knob on the outside is turned to a closed position causing an inside flap to close and eliminate odor from emitting from the dirty litter. A cover is placed over the litter box. Handles may be attached to the cover and the litter box for easy removal.

Figure 1:
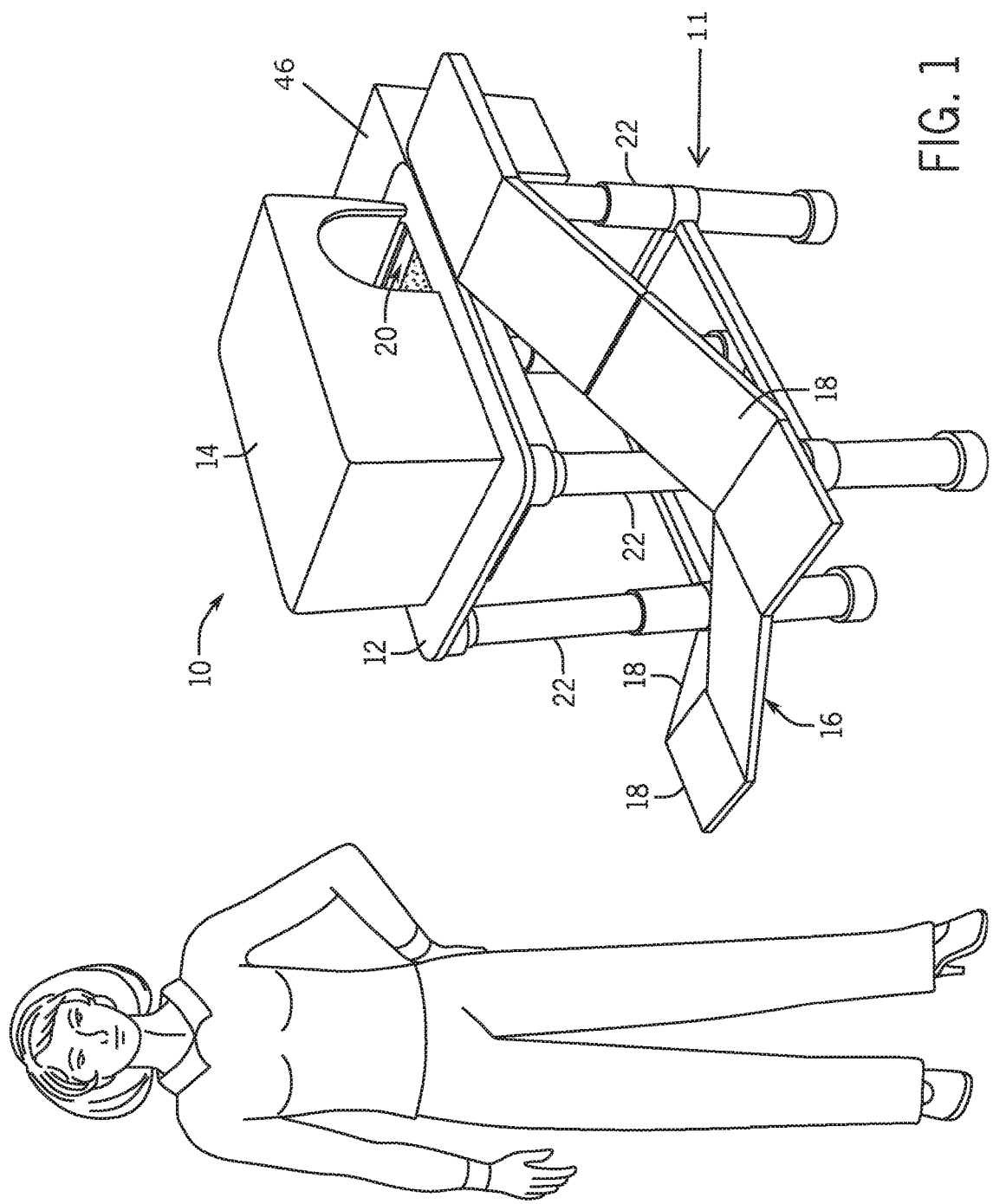
FIG. 1 is a perspective view of an embodiment of the present invention illustrating a waist height of the litter box.
Figure 2:
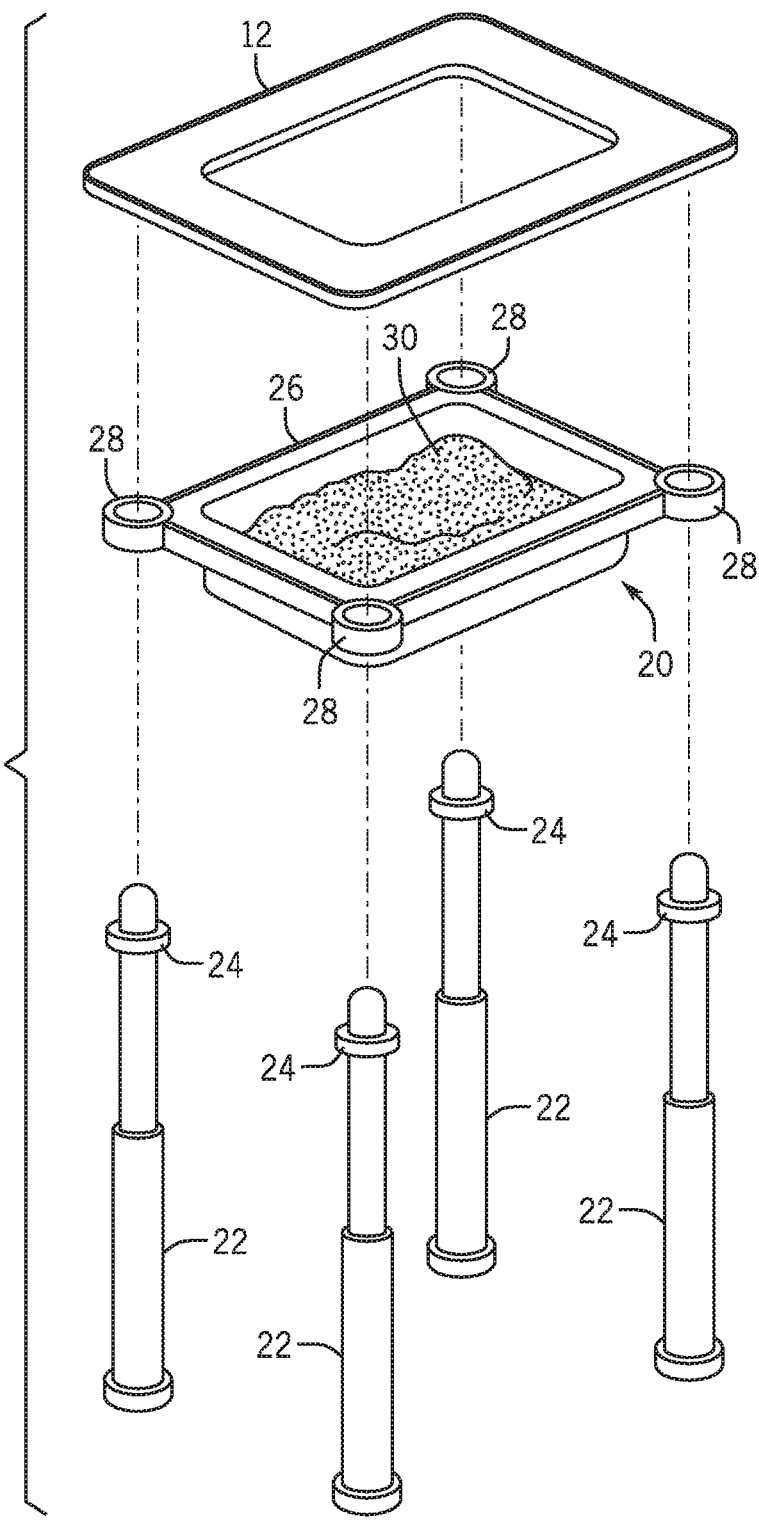
FIG. 2 is an exploded view of an embodiment of the present invention.

Referring to FIGS. 1 through 3, the present invention includes an elevated animal waste repository 10. The repository 10 includes a litter box 20, a base 11 and a ramp 16. The litter box 20 includes a bottom wall and a sidewall extending from the bottom wall. The sidewall may include an upper rim 26 that forms an opening into the litter box 20. A plate 12 may rest against the upper rim. The plate 12 may also include an opening that aligns with the opening of the upper rim 26. The base 11 includes a bottom end and a top end. The litter box 20 is secured to the top end of the base 11. The base 11 supports the litter box 20 in an elevated position when resting on a surface. The elevated position may be waist high level of an individual. The ramp 16 runs from the bottom end of the base to the upper rim 12 of the litter box 20, allowing a cat to access the inside of the litter box 20.

In certain embodiments, the base 11 includes a plurality of legs 22. The plurality of legs 22 may be adjustable in length. For example, each of the plurality of legs 22 may include telescoping tubes. Therefore, the height of elevation of the litter box 20 may be adjusted to be at the waist height of different sized individuals. The telescoping tubes may be locked in place by aligning apertures and locking pegs running through the aligned apertures. Alternatively, the telescoping tubes may be locked in place cams, clips and the like.

In certain embodiments, the litter box 20 may removably attached to the base, and thereby easily separated from the base 11. Therefore, a user may easily remove the litter box 20 and empty out the dirty litter 30. In such embodiments, the top ends of the plurality of legs may include a peg and a flange 24. Each corner of the litter box 20 may include slots 28. The slots 28 fit over the peg and rest on the flange 24. To separate the litter box 20 from the base 11, the user may lift the litter box 20 and thereby lift the slots 28 from the pegs.

The present invention may further include a removable cover 14. The cover 14 may include a top wall and a sidewall extending from the top wall. The sidewall may include a bottom rim forming an opening. The bottom rim may rest against the plate 12 of the litter box 20. In certain embodiments, the sidewall of the cover 14 may include a cutout portion forming an entrance into the litter box 20. The cutout portion may be adjacent to a top end of the ramp 16.

As illustrated in FIG. 1, the ramp 16 may be formed of a plurality of panels 18 pivotally secured together. To secure the ramp 16 to the repository 10, the panels 18 are folded away from one another and attached to the base 11. The ramp 16 may wrap around a first side, a second side and a third side of the base 11 so that the angle of the ramp is low enough to permit the cat to walk up the ramp 16 with ease. As illustrated in FIG. 3, the ramp 42 of the present invention may include a plurality of panels 44 that only wrap around a first side and a second side, which increases the angle of the panels 44.

The present invention may include additional components. For example, the present invention may include a dirty litter receptacle 46. The dirty litter receptacle 46 may be attached to a side of the litter box 20 allowing users to easily scoop dirty litter and place the dirty litter within the dirty litter receptacle 46. A plastic bag may be placed within the dirty litter receptacle 46, so that users may easily transfer the dirty litter 30 to the trash. The present invention may further include handles extending from the sides of the litter box 26 and from the cover 14, allowing users to easily remove the litter box 26 and the cover 14 from the base 11.

In certain embodiments, the legs 22, the litter box 26 and cover 14 are made of plastic, rubber or the like. The climbing ramp 16 may be made of plastic or wood and may include a gripping material, such as a fabric or rubber material.

It should be understood, of course, that the foregoing relates to exemplary embodiments of the invention and that modifications may be made without departing from the spirit and scope of the invention as set forth in the following claims.

What is claimed is:

1. An elevated animal waste repository comprising:
   a litter box comprising a bottom wall and a sidewall extending from the bottom wall, wherein the sidewall comprises an upper rim forming an opening into the litter box, the litter box further comprising a plurality of sockets;
   a plurality of legs comprising a bottom end and a top end, wherein the top end of each of the plurality of legs comprises a peg and a flange, wherein each of the pegs is disposed within a corresponding socket of the plurality of sockets, thereby attaching the litter box to the top end of the plurality of legs, wherein the plurality of legs support the litter box in an elevated position when resting on a surface; and
   a ramp running from the bottom end of the plurality of legs to the upper rim of the litter box.

2. The elevated animal waste repository 1, wherein each of the plurality of legs comprise an adjustable length.

3. The elevated animal waste repository 2, wherein each of the plurality of legs comprise telescoping tubes.

4. The elevated animal waste repository 1, further comprising a cover comprising a top wall and a sidewall extending from the top wall, wherein the sidewall comprises a bottom rim forming an opening, wherein the bottom rim rests against the top rim of the litter box.

5. The elevated animal waste repository 4, wherein the sidewall of the cover comprises a cutout portion forming an entrance, wherein the entrance is disposed adjacent to a top end of the ramp.

6. The elevated animal waste repository 1, wherein the ramp wraps around at least a portion of the plurality of legs.

7. The elevated animal waste repository 1, wherein the litter box is elevated to a waist level.

8. The elevated animal waste repository 1, further comprising a dirty litter receptacle secured to a side of the litter box.

9. An elevated animal waste repository comprising:
   a litter box comprising a bottom wall and a sidewall extending from the bottom wall, wherein the sidewall comprises an upper rim forming an opening into the litter box;
   a plurality of legs comprising a bottom end and a top end, wherein the litter box is attached to the top end of the plurality of legs and the a plurality of legs supports the litter box in an elevated position when resting on a surface; and
   a ramp disposed adjacent to the plurality of legs, wherein the ramp runs from the bottom end of the plurality of legs to the litter box, wherein
   a top end of each of the plurality of legs comprise a peg and a flange and the litter box comprises a plurality of sockets sized to receive and retain the peg within.

10. The elevated animal waste repository of claim 9, wherein the ramp wraps around the plurality of legs.

11. The elevated animal waste repository 9, wherein each of the plurality of legs comprise an adjustable length.

12. The elevated animal waste repository 11, wherein each of the plurality of legs comprise telescoping tubes.

13. The elevated animal waste repository 9, further comprising a cover comprising a top wall and a sidewall extending from the top wall, wherein the sidewall comprises a bottom rim forming an opening, wherein the bottom rim rests against the top rim of the litter box.

14. The elevated animal waste repository 13, wherein the sidewall of the cover comprises a cutout portion forming an entrance, wherein the entrance is disposed adjacent to a top end of the ramp.

* * * * *